United States Patent [19]

Soussloff

[11] Patent Number: 4,543,704
[45] Date of Patent: Oct. 1, 1985

[54] METHOD FOR ANCHORING A MACHINE ELEMENT COAXIALLY ON A ROTARY SHAFT

[75] Inventor: Dimitri G. Soussloff, Wyomissing, Pa.

[73] Assignee: Fenner America Inc., Manheim, Pa.

[21] Appl. No.: 594,950

[22] Filed: Mar. 30, 1984

Related U.S. Application Data

[63] Continuation of Ser. No. 332,966, Jul. 12, 1982, abandoned, which is a continuation-in-part of Ser. No. 179,286, Mar. 10, 1980, Pat. No. 4,345,851, which is a continuation-in-part of Ser. No. 923,056, Jul. 10, 1978, Pat. No. 4,202,644.

[51] Int. Cl.⁴ ............................................. B23P 25/00
[52] U.S. Cl. ....................................... 29/458; 29/525; 29/526 R; 403/254
[58] Field of Search ...................... 29/525, 526 R, 458; 403/254, 369, 370

[56] References Cited

U.S. PATENT DOCUMENTS

| | | |
|---|---|---|
| 2,151,831 | 3/1939 | Buccicone . |
| 2,515,303 | 7/1950 | Isnard . |
| 2,924,876 | 2/1960 | Lewis .................................... 29/458 |
| 3,099,083 | 7/1963 | Delong ................................. 29/458 |
| 3,227,250 | 1/1956 | Cram ................................. 29/458 X |
| 3,501,183 | 3/1970 | Stratienko . |
| 3,614,140 | 10/1971 | Nestor . |

FOREIGN PATENT DOCUMENTS

| | | |
|---|---|---|
| 0007217 | 1/1980 | European Pat. Off. . |
| 2726593 | 6/1977 | Fed. Rep. of Germany . |
| 7203323 | 9/1973 | France . |

Primary Examiner—Charlie T. Moon
Attorney, Agent, or Firm—Dann, Dorfman, Herrell and Skillman

[57] ABSTRACT

A method of mounting a machine element on a shaft by means of a device which fits between the interior cylindrical bore of the machine element and the outer surface of the shaft. The device has a sleeve formed of three separable segments, the inner surface of the sleeve being tapered and the outer surface being substantially cylindrical about the axis of the bore of the machine element. In accordance with the invention the surface of the shaft is machined so as to be tapered with a taper corresponding to the taper on the interior surface of the sleeve whereby the sleeve and the tapered portion of the shaft mate. At one side of the tapered portion the shaft is of greater diameter than the largest interior diameter of the sleeve and on the other side the shaft is of a diameter smaller than the smallest interior diameter of the sleeve. Adjacent the tapered portion the smaller diameter part of the shaft is threaded. A threaded nut is provided to cooperate with the threads on the shaft and is interlocked with the segmented sleeve with opposing dry surfaces so that threaded engagement of the nut drives the segmented sleeve along the tapered surface of the shaft. The engagement of the drive surfaces with the segments of the sleeve affords limited pivotal movement of the segments to accommodate expansion and contraction of the sleeve upon the displacement along the tapered surface. The shaft is precisely machined to conform to the taper of the interior surface of the sleeve and is threaded to mate snugly with the threaded nut.

4 Claims, 8 Drawing Figures

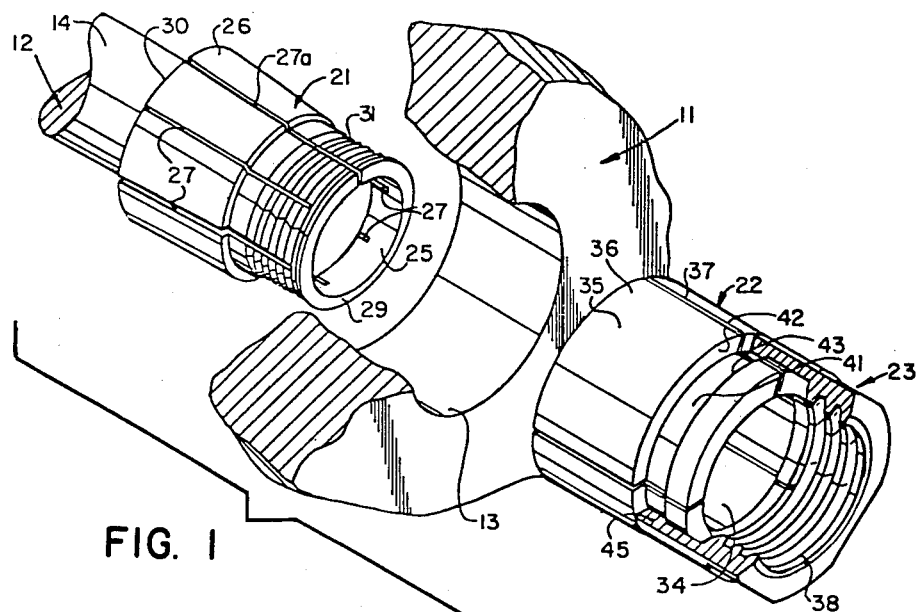
FIG. 1
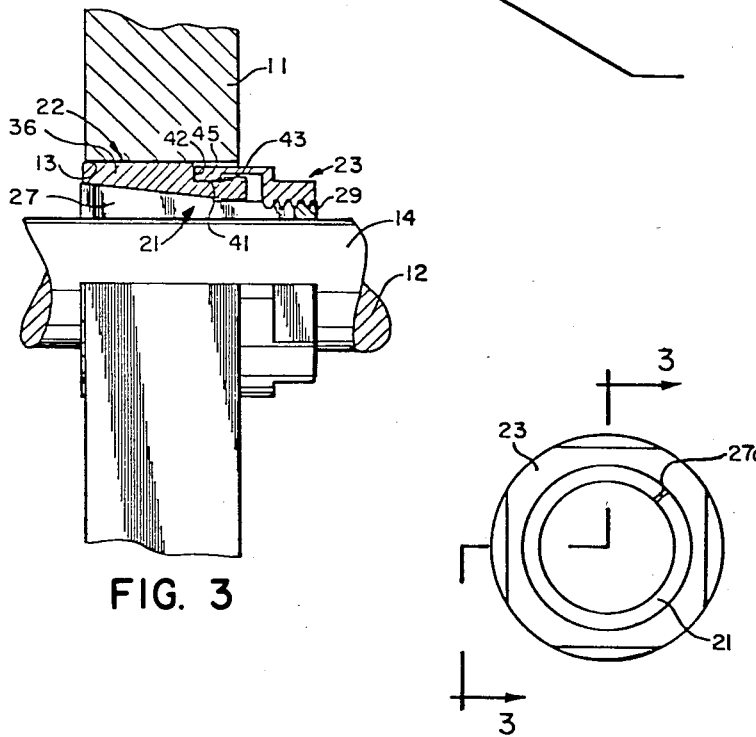
FIG. 3
FIG. 2

METHOD FOR ANCHORING A MACHINE ELEMENT COAXIALLY ON A ROTARY SHAFT

RELATED APPLICATION

The present application is a file wrapper continuation of U.S. patent application Ser. No. 332,966, filed July 12, 1982, now abandonded, which is a continuation-in-part of my U.S. patent application Ser. No. 179,286 having a filing date of Mar. 10, 1980 (now U.S. Pat. No. 4,345,851), derived from PCT Application No. US79/00480 filed July 10, 1979 as a continuation-in-part of U.S. patent application Ser. No. 923,056 filed July 10, 1978 and now issued as U.S. Pat. No. 4,202,644 dated May 13, 1980.

FIELD OF THE INVENTION

The present invention relates to mounting a machine element upon a shaft in such a manner that the rotation of the shaft transmits its entire torque to the machine element without slippage due to the mounting. In particular the device of the present invention provides an improved mounting method which avoids the need for keys or keyways in the shaft or the machine element to effect the mounting, thereby permitting infinitely-variable adjustment of the machine element circumferentially of the shaft as well as limited adjustment axially of the shaft.

BACKGROUND OF THE INVENTION

Prior to the time when the mounting device of my U.S. Pat. No. 4,202,644 became available, the standard practice was to provide keyways in the shaft and on the confronting cylindrical surface of the machine element which were registered to enable the insertion of a key to mount the element on the shaft against relation rotation. Earlier attempts to overcome the drawbacks of the conventional mounting involved complicated mechanism which required a high degree of skill and competance to perform the assembly initially and to make any adjustments which are normally required when an adjustable mounting is specified.

The device of my U.S. Pat. No. 4,202,644 overcomes the problems of the conventional keyed union between the shaft and the machine element and also the inherent expense and difficulties encountered in the use of other commercial units.

The device of my patent is designed to be universely applicable to existing machinery. The present invention provides a method of mounting a machine element on a shaft which operates on the principle of my invention and is made simpler, and requires less room and is more economical by modifying the shaft to incorporate one of the operative parts of my mechanism.

SUMMARY OF THE INVENTION

With the foregoing in mind the present invention provides a method for mounting a machine element on a shaft utilizing components of my patented connector of U.S. Pat. No. 4,202,644 and obtaining the principle advantages of such connector.

The method of the present invention mounts the machine element on the shaft so that it is positively engaged without slippage and yet may be readily disengaged for adjustment or replacement.

The present invention provides a multi-piece unit which may be assembled and slipped into position on the shaft and will remain assembled until it is disengaged from the shaft.

All of the objects of the invention are more fully set forth hereinafter with reference to the accompanying drawings.

DESCRIPTION OF THE DRAWING

FIG. 1 is a fragmentary exploded perspective view of a mounting device made in accordance with U.S. Pat. No. 4,202,644;

FIG. 2 is an end view of the mounting device as seen from the right hand end of FIG. 1;

FIG. 3 is a transverse sectional view taken on the irregular section line 3—3 of FIG. 2;

DETAILED DESCRIPTION OF THE INVENTION

Figure 4:
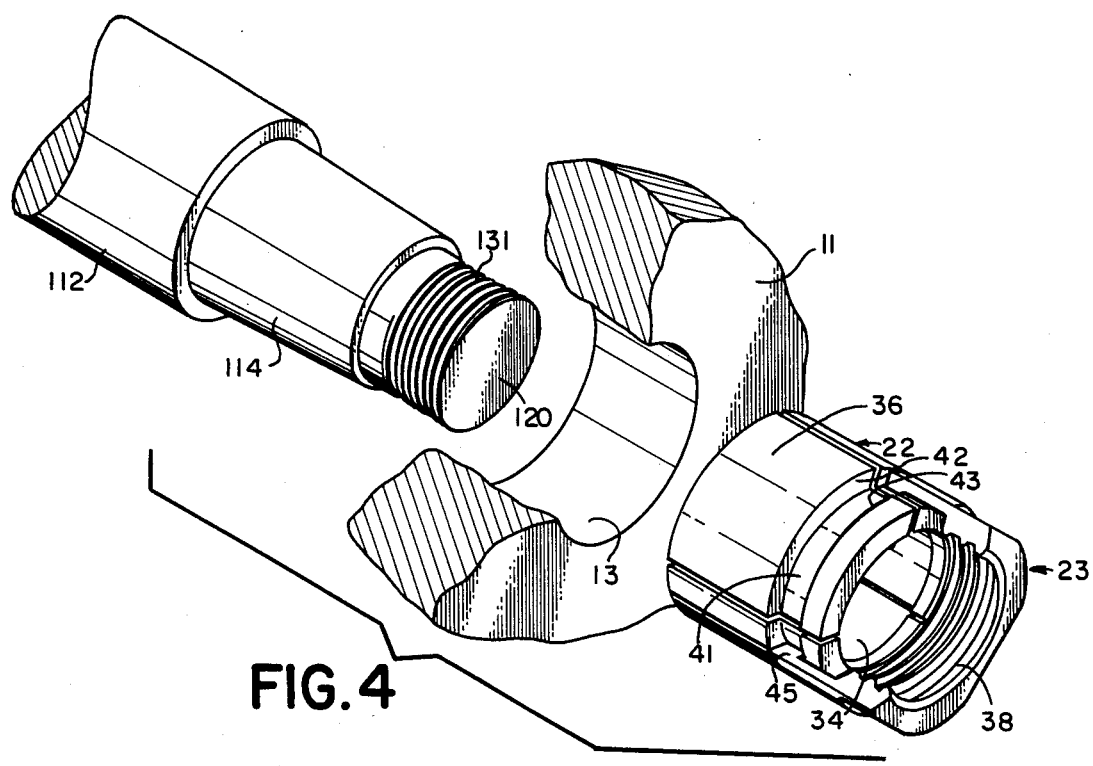
FIG. 4 is a view similar to FIG. 1 illustrating a mounting arrangement made in accordance with the method of the present invention.

With reference to the patented mounting device shown in FIGS. 1-3, the mounting device is designed to mount the hub of a machine element 11 upon a cylindrical shaft 12. In the present instance, the machine element 11 has a smooth cylindrical bore 13 (see FIG. 1) whose axis coincides with the axis of the cylindrical surface 14 of the shaft 12. The mounting device is designed to be positioned between the bore 13 and the surface 14 and to be expanded therein to securely anchor the element 11 on the shaft 12 at any desired position axially of the shaft and at any angular position circumferentially of the shaft.

The mounting device incorporates an inner segmented sleeve 21, an outer segmented sleeve 22, and a locking nut 23. The inner sleeve 21 is tubular in form having an internal cylindrical bore 25 whose diameter corresponds to the diameter of the surface 14, the bore 25 being of sufficiently greater diameter than the surface 14 to permit free sliding movement of the sleeve 21 on the shaft 12 both axially and circumferentially. The sleeve 21 is formed into a plurality of segments 26 by means of slots 27 which extend axially longitudinally of the sleeve from the left-hand end 30 in FIGS. 1 and 3. All but the slot 27a terminate along a line spaced inwardly from the right-hand end 29, and provide a split ring which is externally threaded as indicated at 31, the threads extending throughout the length of the split ring portion at 29 and into the inner portions of the segments 26 formed by the terminated slots 27. The free ends of these segments 26 have tapered external surfaces.

The inner sleeve 21 is adapted to fit within the outer sleeve 22, and the outer sleeve 22 comprises three separate segments 36 formed by axial slots 37 which extend longitudinally through the entire length of the sleeve 22. In the present instance, the slots 37 are three in number to provide segments 36, each of which embraces approximately one-third of the circumference of the sleeve. The outer surfaces 35 of the three segments combine to provide a cylindrical surface having a diameter corresponding to the diameter of the bore 13 and the segments have an internal surface 34 which has a tapered configuration, the taper of which corresponds to the taper of the external surface of the segments 26. The width of the slots 37 is sufficient to permit contraction of the segments 36 to fit within the bore 13 prior to tightening engagement of the inner sleeve 21 with the outer sleeve 22. When the outer sleeve 22 is displaced on the inner sleeve 21 against the respective tapers, the tapered surfaces of the inner and outer sleeves cooperate to expand and contract respectively the external and internal cylindrical surfaces of the sleeves 22 and 21.

The outer sleeve 22 is displaced axially relative to the sleeve 21 by means of the nut 23. To this end, the nut 23 has internal threads 38 which threadedly engage the threads 31 of the inner sleeve 21. Rotating the nut 23 on the inner sleeve 21 axially displaces the nut relative to the inner sleeve. As shown, the threads 31 and 38 are of the truncated-tooth type known as "Acme" or jackscrew threads. A standard thread having 10 threads per inch or approximately 4 threads per cm. has a helix angle of 1.52° and a thread tooth angle of approximately 15°. A thread configuration of this character has been found fully effective to relatively displace the sleeves by means of the nut.

The nut 23 is axially interlocked with the outer sleeve 22 so as to permit the segments 36 of the outer sleeve to slide up and down the inclined outer surface of the segments 26. Sliding up the surface locks the mounting device both against the shaft and against the bore of the element. Sliding down the surface unlocks the mounting device. To this end, the outer sleeve 22 is provided with a circumferential groove 41 on its outer surface, the forward and rearward sidewalls 42 and 43, respectively, of the groove 41 being substantially perpendicular to the common axis of the assembly. Cooperating with the groove 41, a flange 45 having a width slightly less than the width of the groove 41 is provided on the internal surface of the nut 23, the forward and rearward surfaces of the flange 45 confront the forward and rearward surfaces 42 and 43 so as to operate as oppositely-directed drive surfaces effecting forceful axial movement of the outer sleeve 22 as the nut is threadedly displaced on the inner sleeve 21. The interlock provided by the groove 41 and the flange 45 enables the outer sleeve segments to be displaced without strain or distortion of the material composing the segments 36.

Figure 5:
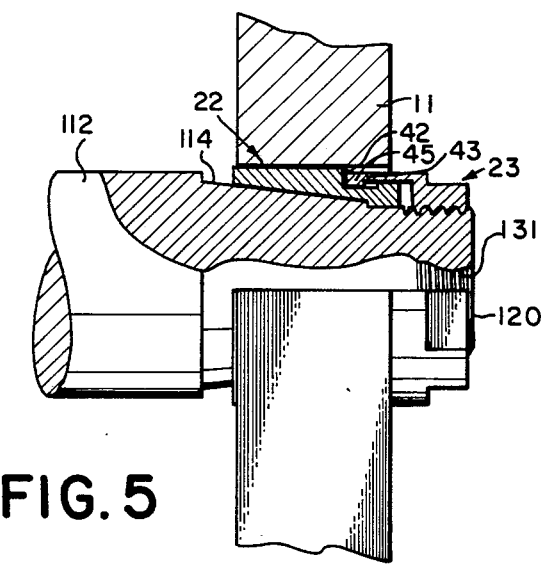
FIG. 5 is a transverse sectional view taken on an irregular section line similar to the sectional view of FIG. 3.

In accordance with the present invention a simplified method of mounting the machine element 11 on a shaft is achieved by eliminating the inner sleeve 21, and in lieu thereof, machining the shaft to serve the dual function of the inner sleeve 21 and the shaft 12. The mounting of this method is illustrated in FIGS. 4 and 5 wherein a shaft 112 is machined with a tapered external surface 114 which conforms to the taper of the outer sleeve 22. In the present instance the shaft 112 terminates in a reduced cylindrical portion 121 beyond the tapered surface 114. The portion 121 extends to the terminal end 120 of the shaft and is threaded as indicated at 131 with threads corresponding to the internal threads 38 of the nut 23. The outer diameter of the threaded end portion 121 is less than the smallest internal diameter of the segmented sleeve 22 and the outer diameter of the shaft 112 on the other side of the tapered portion 114 is larger than the largest diameter of the segmented sleeve 22. In this fashion the sleeve 22 when assembled and engaged on the shaft 112 will find a position on the tapered surface 114 and will mate properly with the tapered internal surface of the sleeve 22 conforming to the external tapered surface 114 of the shaft 112. It should be noted that in the interlock between the flange 45 and the groove 41, the limited clearances between the inwardly-facing surfaces of the nut 23 and the outwardly-facing surfaces of the sleeve 22 prevent the forward end of the sleeve 22 from being driven against the shoulder provided in the illustrated embodiment between the outer diameter of the shaft 112 and the tapered surface.

Figure 6A:
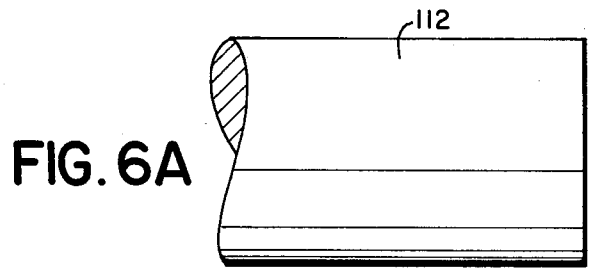
FIGS. 6a, 6b and 6c are illustrations showing the machining of the shaft embodied in the preparation of the shaft for the method of the present invention.
Figure 6B:
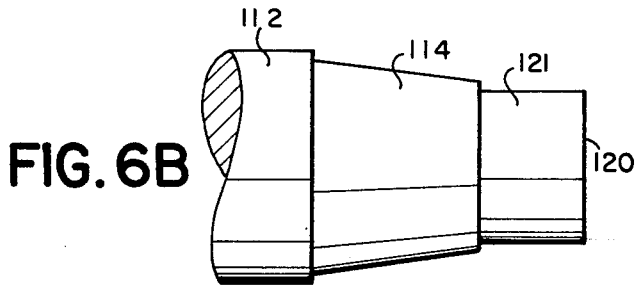
Figure 6C:
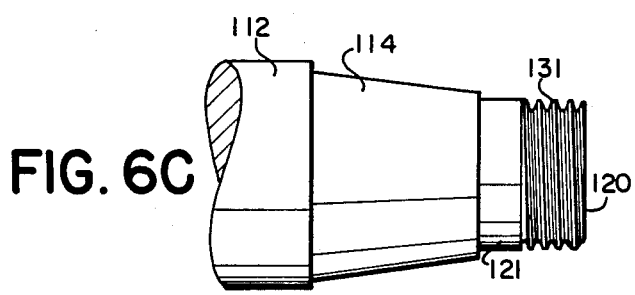

In preparing the shaft 112, as shown in FIG. 6, the shaft is first preferably machined as indicated in FIG. 6b to provide the cylindrical end portion at 121 and the tapered mid-portion 114, the body portion 112 remaining at its original diameter. Subsequent to the machining of the portions 121 and 114, the end portion 121 is threaded to provide the threads 131 which conform to the internal threads 38 of the nut 23. The machining operations required for adapting the shaft 112 to accomodate the sleeve 22 and nut 23 are standard operations which are readily performed in any machine shop and do not require precise accomodation to achieve the desired final adjustments in the machine, as would be the case in the event of the prior art key-and-keyway methods of assembly. The machine element 11 may be adjusted axially on the shaft within the range of the tapered portion 114 since the element 11 may be positioned at any point along the outer surface of the sleeve 22 as the sleeve is adjusted on the tapered portion to firmly anchor the element 11 in place. Likewise, the element 11 and the sleeve 22 may be adjusted a full 360° circumferentially on the tapered portion 114. As noted above, the relative dimensions of the shaft, the sleeve and the nut restrict displacement of the sleeve to maintain surface-to-surface engagement between the tapered surfaces 114 and 34 along their axial extent.

In operation according to the present invention, it should be noted that the mounting components 36 forming the sleeve 22 are forcefully engaged between the bore 13 of the element 11 on one hand and the tapered surface 114 of the shaft 112 on the other hand by tightening the nut 23 to displace the inner and outer sleeves relative to one another upwardly against the taper of the shaft surface 114. This displacement tends to expand the exterior surface of the sleeve 22. Likewise, the unit may be forcefully disengaged from between the element 11 and the shaft 112 by reverse rotation of the nut 23 so as to forcefully displace the sleeve 22 downwardly in the direction of the taper of the shaft surface 114. This displacement permits contraction of the exterior surface of the sleeve 22. The forceful displacement of the outer sleeve relative to the inner sleeve is accomplished by the drive surfaces consisting of the sides of the flange 45 and the sides of the groove 41. As shown in FIG. 5, during the tightening operation the drive surfaces 42 engage and displace the sleeve 22, and during the loosening operation the drive surfaces 43 forcefully engage one another to displace the sleeve 22.

If it is necessary to disassemble the unit, after disengaging the nut 23 and the segmented sleeve 22 from the shaft, the sleeve 22 may be disengaged from interlocking relationship with the nut 23 by displacement of the individual segments 36 inwardly to disengage the groove 41 from the flange 45. However, when the nut 23 is engaged with the threads 131 of the shaft 112, the shaft will prevent the inward displacement of the segments 36 and the mounting unit is thereby retained in properly assembled relationship and may be handled as a unit, as it is displaced on the shaft 112 and positioned properly to receive the machine element 11.

As shown, the outer diameter of the nut 23 is less than the interior cylindrical bore of the machine element 11, so that the element may be disengaged from the outer surface of the sleeve 22 without disengaging the nut from the threads 131. The nut is loosened to drive the sleeve down the tapered surface 114 and allow the segments 36 to contract and release the element, thereby allowing the element to be displaced over the nut at the end of shaft. Likewise, when the machine element is first mounted on the shaft, it is slipped over the nut and is positioned axially on the sleeve, before the nut is tightened to drive the element 22 up the tapered surface 114 and permit the segments 36 to expand and lock against the cylindrical bore of the element 11.

The performance of the mounting unit may be defined as the ratio of the torque which the unit can transmit when installed over the torque which must be imposed on the nut to properly install the unit. The higher this ratio, the better the performance of the unit. With the truncated threads shown in this figure, and an angle of taper of approximately 3° with a steel-to-steel surface engagement providing a coefficient of friction of 0.78 between the non-lubricated interface between each sleeve and the machine element or the shaft and a coefficient of friction of 0.125 in the slightly lubricated steel interface between the respective sleeves and the nut, an improved theoretical performance ratio is achieved.

To facilitate the operation of the device, the nut 23 is coated with an anti-friction coating by the normal coating techniques. For example, coating the nut with a tetrafluoroethylene ("Teflon") coating is effective to reduce the theoretical coefficient of friction of the interfaces of the nut to approximately 0.04. By this simple expedient, the performance ratio was increased even more.

The present invention is particularly effective to avoid damage to the shaft and the machine elements in case of catastrophic overload of the machine. A major advantage of the construction of the invention is that when the applied torque exceeds the torque-transmitting limit of the unit, the sleeve simply slips and protects other elements without damage to the shaft or the machine element. In the event of slippage due to excess loading, the unit itself is not damaged and may be used without replacement or readjustment. The construction also enables the unit to be fabricated from materials other than metal where the operating conditions are such as to limit the selection of the material used in frabricating the parts.

The use of a single nut circumscribing the shaft as the sole drive element for both tightening and releasing the mounting unit provides an efficient utilization of tightening torques, as it has been found that a tightening torque of only about 1000 inch-pounds (113 Newton-meters) on the nut is sufficient to provide a connection between a one-inch (25.4 mm) shaft and a machine element which will transmit a torque of approximately 3,000 inch-pounds (339 Newton-meters) at any practical speed. To disassemble the device, it has been found that only about 500 inch-pounds (56 Newton-meters) are necessary to disengage the mounting unit. This highly efficient torque ratio enhaces the practical ability to install and remove the device.

While particular embodiments of the present invention have been herein illustrated and described, it is not intended to limit the invention to such disclosure, but changes and modifications may be made therein and therto within the scope of the following claims.

I claim:

1. A method for mounting a machine element having a cylindrical bore at a desired axial position coaxially on a shaft using a device comprising a segmented sleeve adapted to encircle said shaft, said sleeve having a tapered internal surface, a straight cylindrical outer surface corresponding in diameter to the cylindrical bore of said machine element and outwardly-directed circumferential interlock means adjacent said outer cylindrical surface providing opposed forward and rearward radial drive surfaces substantially perpendicular to the central axis of said shaft, said interlock means having outer cylindrical surfaces with diameters less than the diameter of said cylindrical bore, said segmented sleeve comprising a plurality of separate separable segments, and a threaded clamping nut adapted to encircle said shaft in circumscribing engagement with said interlock means of the sleeve and having an outer diameter less than the cylindrical bore of the machine element and inwardly-directed cooperating circumferential interlock means defining opposed forward and rearward drive surfaces adapted to confront the corresponding surfaces of the interlock means of said sleeve, whereby upon axial displacement of said nut in one direction, the forward surfaces of the respective interlock means engage and effect axial displacement of said sleeve in one direction, and upon axial displacement of said nut in the opposite direction, the rearward surfaces of the respective interlock means engage and effect axial displacement of said sleeve in the opposite direction, said method comprising the steps of providing coaxially on said shaft a first cylindrical surface having an external diameter greater than the largest internal diameter of said sleeve, a second cylindrical surface of a diameter smaller than the smallest internal diameter of said sleeve at one end of said shaft and a tapered surface between said portions having a taper corresponding to the tapered internal surface of said sleeve, providing a threaded portion on said second cylindrical surface of said shaft, said threaded portion adapted to threadedly engage the threaded portion of the nut so that rotation of said nut on said shaft effects said axial displacement of said nut in opposite directions, interlocking said clamping nut with said segmented sleeve so that the drive surfaces of the nut confront the corresponding drive surfaces of the sleeve, engaging said sleeve on tapered surface provided on said shaft while interlocked with said nut and threading the clamping nut on the threaded portion provided on said shaft, passing the machine element over the nut and registering the cylindrical bore of said machine element in circumscribing relation to the cylindrical outer surface of said sleeve at the desired position, and tightening said nut to drive said sleeve up the tapered surface of said shaft, and effective expansion of said sleeve within said bore to firmly anchor said machine element on said shaft, the relative dimensions of said shaft, said sleeve and said nut restricting displacement of said sleeve to maintain surface-to-surface engagement between said tapered surfaces along their axial extent.

2. A method according to claim 1 comprising the step of including anti-friction means within the threaded engagement of said clamping nut and said shaft to reduce the friction opposing rotation of said nut on said shaft.

3. A method according to claim 2 wherein said anti-friction means comprises an anti-friction coating encapsulating said clamping nut.

4. A method according to claim 3 wherein said clamping nut is encapsulated in an anti-friction coating of tetrafluoroethylene.

* * * * *